United States Patent
Bond et al.

[11] Patent Number: 6,056,883
[45] Date of Patent: *May 2, 2000

[54] METHOD AND APPARATUS TO REMOVE INORGANIC SCALE FROM A SUPERCRITICAL WATER OXIDATION REACTOR

[75] Inventors: Luke David Bond, Etobicoke; Charles Cheslay Mills, Mississauga; Philip Whiting, Milton, all of Canada; Stanley Lee Koutz, San Diego, Calif.; David Alan Hazlebeck, El' Cajon, Calif.; Kevin William Downey, San Diego, Calif.

[73] Assignee: Abitibi Consolidated Inc., Montreal, Canada

[*] Notice: This patent is subject to a terminal disclaimer.

[21] Appl. No.: 09/206,875

[22] Filed: Dec. 8, 1998

Related U.S. Application Data

[63] Continuation of application No. 08/713,804, Sep. 12, 1996, abandoned, which is a continuation-in-part of application No. 08/455,713, May 31, 1995, Pat. No. 5,560,822, which is a division of application No. 08/255,070, Jun. 7, 1994, Pat. No. 5,501,799.

[51] Int. Cl.[7] .................................................. C02F 1/74
[52] U.S. Cl. ...................... 210/721; 210/737; 210/759; 210/761
[58] Field of Search ................................ 210/712, 721, 210/761, 762, 765, 766, 737, 774, 759

[56] References Cited

U.S. PATENT DOCUMENTS

| | | | |
|---|---|---|---|
| 2,665,249 | 1/1954 | Zimmermann | 210/2 |
| 2,944,396 | 7/1960 | Barton et al. | 210/762 |
| 4,292,953 | 10/1981 | Dickinson | 110/266 |
| 4,543,190 | 9/1985 | Modell | 210/721 |
| 4,822,497 | 4/1989 | Hong et al. | 210/721 |
| 5,100,560 | 3/1992 | Huang | 210/721 |
| 5,200,093 | 4/1993 | Barner et al. | 210/761 |
| 5,250,193 | 10/1993 | Sawicki et al. | 210/761 |
| 5,252,224 | 10/1993 | Modell et al. | 210/761 |
| 5,358,646 | 10/1994 | Gloyna et al. | 210/761 |
| 5,384,051 | 1/1995 | McGinness | 210/761 |
| 5,501,799 | 3/1996 | Bond et al. | 210/761 |
| 5,560,822 | 10/1996 | Bond et al. | 210/181 |
| 5,560,823 | 10/1996 | Whiting | 210/205 |
| B1 4,338,199 | 11/1988 | Modell | 210/721 |

FOREIGN PATENT DOCUMENTS

| | | |
|---|---|---|
| 0 535 320 A1 | 4/1993 | European Pat. Off. . |
| PCT/US81/00592 | 11/1981 | WIPO . |
| PCT/7S91/00606 | 8/1991 | WIPO . |

*Primary Examiner*—Peter A. Hruskoci
*Attorney, Agent, or Firm*—Hoffmann & Baron, LLP

[57] ABSTRACT

A supercritical water oxidation reactor is alternately supplied with a feed stream and a flushing stream. The feed stream contains organic and inorganic materials. The organic materials are oxidized under supercritical conditions in the reactor and the inorganic materials precipitate out of solution under the same conditions. The flushing stream is a solution in which the inorganic material is soluble. More than one supercritical water oxidation reactor may be connected so that the feed stream is alternately supplied to each reactor. During the period when the feed stream is being supplied to a reactor the effluent from the reactor is cooled to a temperature at which inorganic precipitates are soluble and is then supplied as a flushing stream to one or more of the remaining connected supercritical water oxidation reactors.

16 Claims, 5 Drawing Sheets

METHOD AND APPARATUS TO REMOVE INORGANIC SCALE FROM A SUPERCRITICAL WATER OXIDATION REACTOR

This application is a continuation of U.S. Ser. No. 08/713,804 filed Sep. 12, 1996 now abandoned, which is a continuation-in-part of U.S. Ser. No. 08/455,713 filed May 13, 1995 and issued as U.S. Pat. No. 5,560,822, which is a divisional application of U.S. Ser. No. 08/255,070 filed Jun. 7, 1994 and issued as U.S. Pat. No. 5,501,799.

FIELD OF THE INVENTION

This invention relates to supercritical water oxidation reactors and to a method and apparatus to reduce the effect of inorganic precipitates on the efficient operation of such reactors.

BACKGROUND OF THE INVENTION

At temperatures and pressures below its critical point (approximately 374° C.), water is a poor solvent for non-polar materials (including many organic materials) and a good solvent for polar materials (including many inorganic materials). However, at and above the critical temperature of water, many organic compounds become readily soluble in water and many inorganic compounds become insoluble. For example, the solubility of inorganic salts in supercritical water is generally between 1 ppb and 100 ppm above about 450° C., as noted at column 3, lines 39–41 of U.S. Pat. No. 4,338,199 to Modell (hereinafter referred to as "Modell '199").

Supercritical water oxidation ("SCWO") reactors are designed to oxidize organic compounds in water at temperatures and pressures which are above the critical temperature and pressure for water. Under such conditions SCWO reactors are capable of effecting substantially complete oxidation (and hence destruction) of many organic materials, including many toxic organic compounds. The products of such combustion are primarily superheated water, carbon dioxide, inorganic salts and heat. For this reason, SCWO has been proposed as a method of disposing of a wide range of wastes, which contain toxic or noxious organic components. Such wastes include sewage, animal wastes, paper mill wastes and petrochemical wastes. The noxious and toxic compounds suitable for treatment include virtually all oxidizable organic compounds, including dioxins. Supercritical reactors are known and have been described in U.S. Pat. No. 2,944,396 (Barton); U.S. Pat. No. 4,292,953 (Dickinson); U.S. Pat. No. 4,543,190 (Modell et al., hereinafter referred to as "Modell '190"); and others.

Dickinson discloses that a possible limitation to the use of supercritical water oxidation exists in the amount and nature of salts dissolved in the aqueous feed to the reactor. Due to the nature of the supercritical oxidation process, such salts can become concentrated or supersaturated in the reactor. Dickinson further states that with certain types of salts, this concentration effect can result in scaling in the reactor or scaling and/or plugging in downstream heat exchange equipment (column 6, lines 33–47).

The insolubility in water of inorganic compounds at critical conditions has been a major impediment to the development of supercritical water oxidation reactors. Numerous attempts to solve the build-up of scale on the reactor surface have not been successful and have generally required shutting down the reactor and mechanically scrubbing it.

Similarly, Modell '190 states, at column 8, lines 8–34, that in conventional apparatus, inorganics tend to build up on the walls causing hot spots with subsequent destruction of the walls. To overcome this problem, Modell '190 suggests that the inner wall of the reactor be clad with corrosion resistant alloys, such as Hastelloy C, and when high concentrations of inorganic constituents are present, a fluidized bed reactor can be used. However, to do so would greatly increase the cost of the supercritical oxidation reactor.

Several different approaches have been developed to try to overcome this scaling problem. U.S. Pat. No. 4,822,497 (Hong, et al.) discloses a reactor for supercritical water oxidation of organic materials having an upper supercritical zone and a lower subcritical zone. Oxidation of organic materials and inorganic materials, including salts and salt precursors, occurs in the upper zone and salts and other insoluble inorganic precipitates from the oxidation reaction are transferred to the lower subcritical zone when they redissolve and are removed from the reactor as a solution or slurry.

U.S. Pat. No. 5,100,560 (Huang) discloses a supercritical oxidation reactor having an upper supercritical temperature zone and a lower reduced temperature zone. The walls of the reactor are scraped to remove precipitates which deposit on the walls bounding the supercritical temperature zone.

U.S. Pat. No. 5,252,224 to Modell (hereinafter referred to as "Modell '224"), involves a supercritical oxidation process whereby inorganic materials which are insoluble in the oxidation mixture are removed by a combination of mechanical forces and cooling of a downstream portion of the oxidation reactor. This is accomplished by providing the feed stream with a sufficient velocity to prevent the settling out of solid inorganics on the surface of the reactor as the feed stream flows from the inlet to the outlet of the reactor. Such velocity, however, can result in insufficient reaction time of the feed stream to promote complete oxidation thereof within the reactor. Additionally, Modell '224 provides a second zone at the downstream portion of the reactor by providing that portion of the reactor with a cooling jacket which surrounds the reactor tube for purposes of cooling the reactants and forming an effluent mixture which includes gas, liquid, and solid (inorganic) phases. Such reactor designs, however, involve increased costs since a simple tubular reactor must be fitted to account for the additional cooling zone or portion, and further do not compensate for removal of inorganic precipitate and scale which accumulate within the supercritical portion of the reactor.

Modell '224 attempts to further overcome the concerns with the build-up of scale within the reactor through mechanical removal processes which can be accomplished either "on-line" during operation of the reactor, or "off-line", after the reactor is shut down. In the "on-line" process, a wire brush is directed through the interior of the reactor, and is used to scrub the reactor free of scale produced by the deposition of insoluble inorganic material within the reactor. The feed material provides the force for moving the brush within the reactor, causing the brush to dislodge the solid inorganic scale built up on the walls of the reactor and forcing it toward the outlet portion of the reactor. In the "off-line" process, high pressure water is physically directed through the reactor to dislodge the inorganic scale from within the reactor. The high pressure water flushes the dislodged solids from the reactor and into a collection vessel. In further embodiments, a high velocity cleaning spray at supercritical temperatures is used to dislodge the inorganic scale, and finely dispersed abrading solids may be incorporated within the cleaning spray to farther assist in dislodging the scale. While such processes can remove inorganic scale built up within a reactor, they fail to provide a simple effective method which accomplishes removal of the scale in a simple reactor without the need for extraneous equipment and which is capable of producing a simple single phase effluent with solids dissolved therein.

Further, none of these approaches has achieved any commercial success and scaling from the precipitation of inorganic salts remains a major obstacle to the use of SCWO for the treatment of organics in waste streams when the waste stream includes inorganic compounds.

SUMMARY OF THE INVENTION

The invention is directed towards a method of operating a supercritical water oxidation reactor so as to reduce the effect of inorganic precipitates on its efficient operation. The supercritical water oxidation reactor includes means for alternately supplying to said reactor a feed stream of oxidizable materials and a flushing stream in which inorganic compounds precipitated under supercritical conditions are soluble. The reactor also includes means for raising the feed stream to supercritical conditions at which oxidizable compounds are oxidized and inorganic material is precipitated in said reactor. The method includes the steps of: supplying a feed stream to said supercritical water oxidation reactor; raising the temperature of said feed stream to supercritical conditions and oxidizing the oxidizable material in said feed stream; periodically terminating the supply of said feed stream to said reactor; supplying a flushing stream in which inorganic compounds precipitated under supercritical conditions are soluble to said reactor to remove inorganic material from said reactor; and repeating the preceding steps. The flushing stream is suppled from an outside source of said reactor and at a temperature in which inorganic precipate formed during supercritical oxidation conditions is soluble. Preferably, the flushing stream is the effluent of another supercritical reactor, such that the reactors can work together in opposite cycles. Regardless of the source of the flushing stream, supply of the flushing stream is provided as an in-line process step, without having to break down the reactor as is customarily done in the aforementioned prior art processes. Additionally, the flushing stream is provided at a temperature which solubolizes the inorganics which typically form as scale on the reactor surface. No mechanical brushing means or high velocity scrubbing streams are used to mechanically remove the inorganic scale and particulates. Rather, on-line solubilization has been found to be sufficient to remove inorganic particulates and scale without having to take the reactor off-line, dismantle it and mechanically remove the inorganic scale build-up. Once the flushing stream has been provided for a time sufficient to solubolize the insolubolize inorganics, the feedstream is again resumed. As previously stated, alternating between feedstream at supercritical conditions and flushing stream at less than supercritical conditions is accomplished in a continuous fashion while on-line. This is in distinct contrast to the prior art processes which generally go off-line and shut down the reactor to mechanically clean it of inorganic scale build-up.

Another aspect of the invention is a method of oxidizing a mixture of organic compounds, inorganic compounds and water in a supercritical water oxidation reactor comprising the steps of: supplying a feed stream comprised of oxidizable organic materials, inorganic materials and water to a supercritical water oxidation reactor; supplying an oxidant to said reactor; raising the temperature in said reactor to create supercritical conditions whereby said organic compounds are oxidized and at least some of said inorganic materials are precipitated; and flushing said reactor with a flushing solution in which said inorganic materials are soluble.

A further aspect of the invention is a method of oxidizing a feed stream comprising organic compounds, inorganic compounds and water in two or more supercritical water oxidation reactors. The reactors are connected to permit the feed stream to be directed for oxidation in any one of the reactors and to permit the effluent stream from any one of said reactors to be directed to flow through any one or more of the remaining reactors as a flushing stream. The method comprising the steps of: directing said feed stream to one of said supercritical water oxidation reactors and supercritically oxidizing said feed stream whereby said organic compounds are oxidized and at least some of said inorganic compounds precipitate; cooling the effluent stream from said reactor in which supercritical oxidation is occurring to a temperature and pressure at which inorganic scale formed under supercritical condition is soluble in said effluent stream and directing said effluent stream as a flushing stream to flush one or more of said remaining connected supercritical water oxidation reactors to remove inorganic precipitate from said one or more of said remaining connected reactors; and repeating the preceding steps with one of said remaining connected supercritical water oxidation reactors.

The invention is also directed towards a reactor combination for oxidizing a feed stream comprising organic compounds, inorganic compounds and water, the reactor combination comprising: two or more connected supercritical water oxidation reactors; means to allow a feed stream to be directed for oxidation in any one of said reactors; means to allow the effluent stream from said any one of said reactors to cool to a temperature and pressure at which inorganic precipitate formed under supercritical conditions is soluble; and means to allow said cooled effluent stream to be directed as a flushing stream to at least one of said remaining connected two or more supercritical water oxidation reactors to remove inorganic precipitate therefrom.

A still further aspect of the invention is a method of continuously operating a supercritical water oxidation facility having at least two supercritical water oxidation reactors, means for alternately supplying a feed stream containing organic materials, inorganic materials and water and a flushing stream in which inorganic precipitates formed under supercritical conditions are soluble to the reactors, means for supplying an oxidant to the reactors, means for raising the feed stream to supercritical conditions at which substantially all of said organic materials are oxidized and at least some of said inorganic materials are precipitated, the method comprising the steps of: supplying a feed stream to at least one of said reactors; supplying an oxidant to said reactor; supercritically oxidizing substantially all of said organic materials in said reactor; allowing the effluent from said reactor to cool to subcritical conditions at which inorganic compounds precipitated under supercritical conditions are soluble; directing said cooled effluent as a flushing stream to at least one of the remaining reactors; and repeating the preceding steps.

DESCRIPTION OF THE PREFERRED EMBODIMENTS

Figure 1:
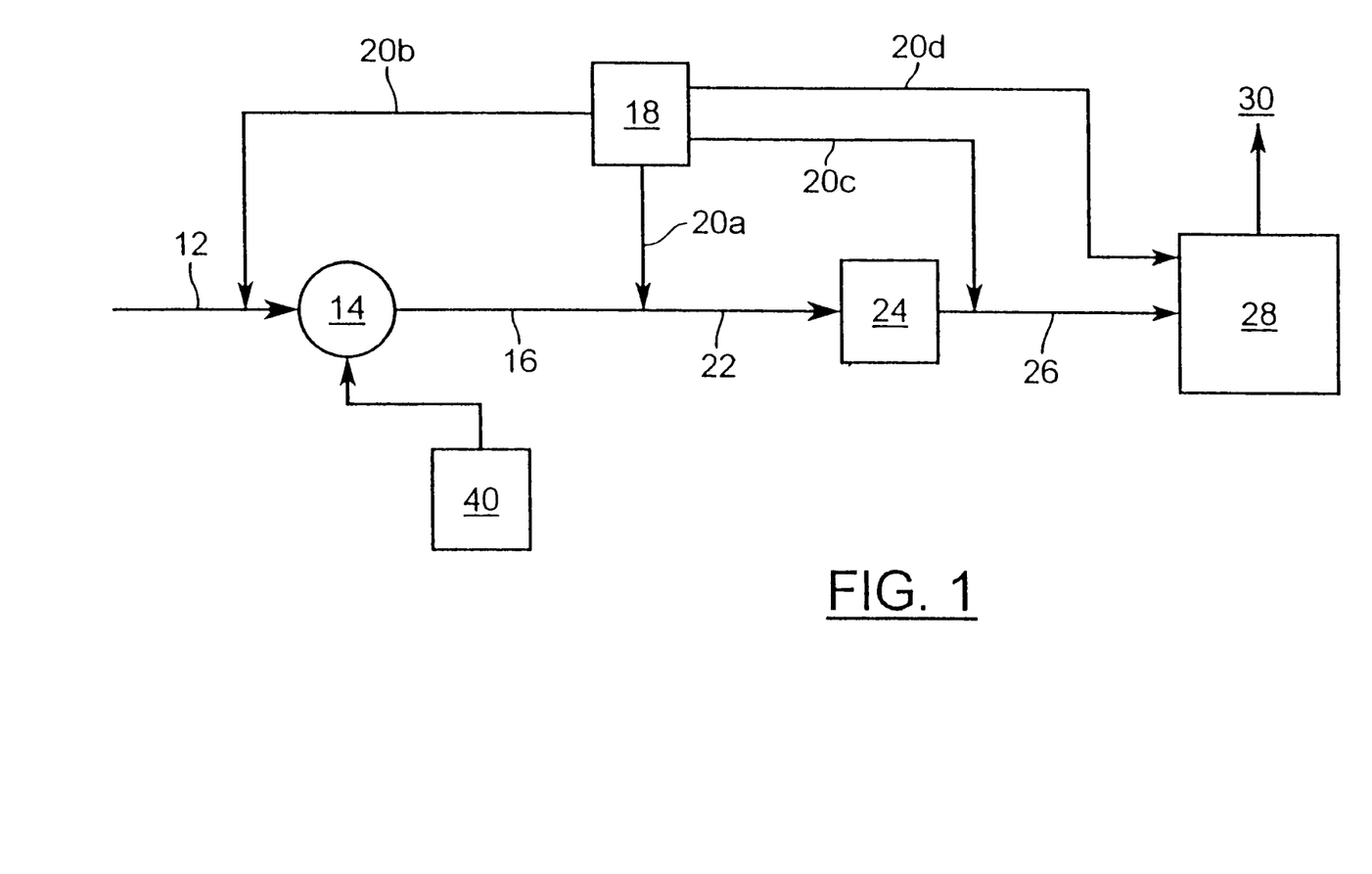
FIG. 1 is a schematic view of a process according to the present invention.

In the single reactor aspect of the present invention shown in FIG. 1, a feed stream to be treated (often a waste stream) is generally designated by reference numeral 12. The feed stream 12 contains organic materials oxidizable under supercritical conditions and may contain one or more inorganic materials including salts and salt precursors. The feed stream 12 may contain inorganic salts, such as calcium chloride, sodium chloride, sodium sulphide and sodium sulphate.

The feed stream 12 is pressurized by a pump means 14. Pump means 14 may be a high pressure piston pump, a diaphragm pump or any other device known in the art which may be used to increase the pressure of a liquid stream.

The pressurized feed stream, which is designated as reference numeral 16, is then mixed with an oxidant. The oxidant may be stored in a storage vessel 18 and fed to pressurized feed stream 16 via an oxidant stream 20(a). The oxidant is preferably at a pressure at least slightly higher than the pressure of the pressurized feed stream 16.

The oxidant stored in storage vessel 18 may, in alternate embodiments, be added to the unpressurized feed stream 12 via oxidant stream 20(b), to the heated feed stream 26 via oxidant stream 20(c), or to the reactor 28 itself via oxidant stream 20(d). If added to the heated feed stream 26 or to the reactor 28, the oxidant is preferably pressurized to a pressure slightly higher than that of the pressurized feed stream 26.

The oxidant may be any of those which are known in the art of oxidation, including, but not limited to, hydrogen peroxide, sodium peroxide, compressed air, liquid oxygen, compressed oxygen and mixtures thereof.

The pressurized feed stream 16 and oxidant stream 20 are mixed to produce a combined feed/oxidant stream 22. The temperature of the feed/oxidant stream 22 is then increased to below the critical temperature of the feed/oxidant stream 22. The heat source can be any conventional heat source although in most cases, as in this case, it is convenient to use a heat exchanger 24, by means of which heat from the reactor effluent 30 can be used to heat the feed/oxidant stream 22. A counter-current heat exchanger is preferred in the embodiments shown here. Alternatively, the feed stream 16 and the oxidant stream 20 may be mixed together at the point of entry to the heat exchanger 24. The oxidation reaction begins as the temperature of the feed/oxidant stream 22 is raised by heat exchanger 24.

The temperature of the feed/oxidant stream 22 is preferably raised, during passage through the heat exchanger 24, to a temperature below the critical temperature of the feed/oxidant stream 22, so that inorganic compounds in the feed/oxidant stream 22 remain in solution, but preferably near enough to the critical temperature that supercritical conditions can be achieved adiabatically in the reactor 28. Generally a suitable temperature is in the region of about 300° C.

The outflow from the heat exchanger 24 is a heated feed/oxidant stream 26. The heated feed/oxidant stream 26 is fed to a reactor 28 wherein the supercritical oxidation occurs. The reactor 28 may be any type of vessel, pipe or other reactor known in the art which is capable of maintaining structural integrity at elevated temperatures and pressures. The residence time of the heated feed/oxidant stream 26 in the reactor 28 is sufficient to allow the oxidation reaction to proceed substantially to completion. If there is a stoichiometric excess of oxidant present then, in many cases, greater than 99% oxidation of the organic compounds in the feed stream 12 can be achieved. Generally, due to the rapid nature of supercritical oxidation, a residence time of one minute or less is sufficient.

The oxidation of the organic material that has commenced in heat exchanger 24 generally produces sufficient heat adiabatically to raise the temperature of the contents of the reactor 28 above the critical temperature so that supercritical conditions are achieved in the reactor. If the oxidation is being carried out as a continuous process in the pipe reactor, and depending on the flow rate, 10% to 50% of the organic material in the feed stream 12 is oxidized before the mixture reaches supercritical temperature. If the heat of oxidation is insufficient, then heat must be added to the reactor to attain a critical or supercritical temperature. This can be done by any conventional means.

Preferably, the contents of the reactor 28 are raised to a temperature from about the critical temperature of the feed stream, which may be as low as 320° C., to about 800° C., more preferably from about 374° C. to about 650° C. and most preferably to about 450° C. to 600° C. In order to maintain the desired temperature of the feed stream in reactor 28, additional heating or cooling of the reactor may be necessary using conventional means.

Once the temperature of the contents of the reactor 28 exceeds the critical temperature of the feed/oxidant stream 22, then the inorganic compounds including salts in the feed/oxidant stream 22 will precipitate out of solution and stick to the walls of the reactor 28 as scale.

The reaction products, which are primarily superheated water, and carbon dioxide exit the reactor as effluent stream 30 and gas which can be depressurized and cooled by conventional means.

The buildup of inorganic precipitates and scale on the interior of the supercritical water oxidation reactor obstructs the flow of the feed/oxidant stream through the reactor thereby reducing throughput, interferes with heat transfer through the reactor walls making it difficult to control conditions in the reactor and accelerates corrosion of the reactor walls.

In accordance with the present invention, the feed to the pump means 14 is periodically switched from the feed stream 12 to a flushing stream 40 comprised of a liquid in which the inorganic precipitates and scale are soluble. The flushing stream may, for example, be a sub-critical aqueous stream. Sub-critical means that the temperature of the flushing stream 40 is below the critical temperature of the flushing stream. The flushing stream may be, for example, fresh water or cooled effluent from an SCWO reactor. The flushing stream 40 will create subcritical conditions in the reactor under which the inorganic precipitates and scale deposited in the reactor under supercritical conditions are soluble and inorganic precipitates and scale are removed from the reactor 28 by the flushing stream. The flushing stream 40 may alternately by-pass the heat exchanger 24 and be directed to the reactor 28 itself.

The temperature of the flushing stream 40 is preferably raised to a temperature of about 300° C. which is sub-critical but high enough to promote the dissolution of the inorganic precipitates and scale.

The flushing stream 40 will reduce the reactor's temperature below the critical temperature of the flushing stream at which point the inorganic scale will begin to dissolve in the flushing stream 40. The time required to dissolve the inorganic precipitates and scale will depend on the characteristics of the reactor (type, diameter, throughput rate, etc.) and the solubility of the precipitate.

Dissolution of the inorganic precipitate and scale in the subcritical flushing stream creates a fluid having a single phase, i.e., a liquid flushing stream having dissolved therein solids which were previously present within the reactor as inorganic precipitate and scale. This is possible since the supercritical reaction is allowed to proceed through completion prior to supplying the flushing stream into the reactor. Thus, during flushing, the flushing stream is capable of being maintained at subcritical temperatures, thereby preventing formation of inorganic precipitate while dissolving the already formed inorganic precipitate and scale.

By dissolving the solid inorganic precipitate and scale into the flushing stream solution, a single phase solution is established within the reactor, without the need for separate reactor zones. In prior art processes such as Modell '224, the reactor was provided with a separate cooling zone to dissolve the inorganic materials. Such a cooling zone, however, was positioned downstream from the main supercritical portion of the reactor, and thus inorganic scale still built up on the walls of the supercritical portion of the reactor. Further, prior art processes which incorporated flowing high pressure fluid through the reactor to dislodge the inorganic scale such as that disclosed in Modell '224 utilized an off-line cleaning process which required a solid collection vessel to collect the solid inorganic material dislodged and forced through the reactor. Through the present process, there is no need to dislodge the scale from the reactor, since the built-up scale is dissolved into the flushing stream solution. As such, there is no need for the use of pressure-forced fluids and collection vessels for solids, but instead the effluent is in the form of a single phase fluid, which can subsequently be treated for removal of the dissolved inorganic material.

Once the inorganic precipitate and scale has been dissolved by the flushing stream 40, the pump means 14 is switched back to the feed stream 12. The temperature of the reactor 28 is then raised to the desired supercritical level, and the oxidation reaction recommences.

The extent to which the throughput of the reactor 28 is obstructed by scaling can be readily determined by, for example, measuring the pressure drop across the reactor 28 during operation. The pressure drop will increase as scaling obstructs fluid flow through the reactor.

If the feed stream 12 is the effluent from a continuous industrial process the effluent generated during the period when the reactor 28 is being flushed must be stored and excess capacity must be built into the system to handle this stored effluent together with effluent generated while the reactor is oxidizing organics.

FIGS. 2(a) through 2(d) show four operating phases of a further aspect of the present invention, in which a first reactor 52 and a second reactor 54 are used to allow continuous operation.

The feed stream 56 is heated in the heat exchanger 50 and can then be switched between the first reactor 52 and the second reactor 54 by opening and closing the valves shown as 60, 62, 64, 66, 68, 70, 72, 74, 76, 78 and 80.

The figures are identical except for status of the valves (open or shut) which change the flow of the feed/oxidant stream 56, the heated stream 58, the hot reactor effluent 84 and the cooled reactor effluent 86 through the reactors 52 and 54 and heat exchanger 50. The addition of the oxidant to the feed stream to produce feed/oxidant stream 56 is not shown.

This aspect of the invention allows substantially continuous operation since one reactor is always active, with supercritical oxidation taking place in it, while the other reactor is idle and being flushed with the reactor effluent from the active reactor.

If the rate at which the scale dissolves is lower than the rate of scaling, as may be the case with some precipitates, more than two reactors may be used. If three reactors are used for example, each reactor is flushed for approximately twice the length of time it is used for oxidation.

Figure 2A:
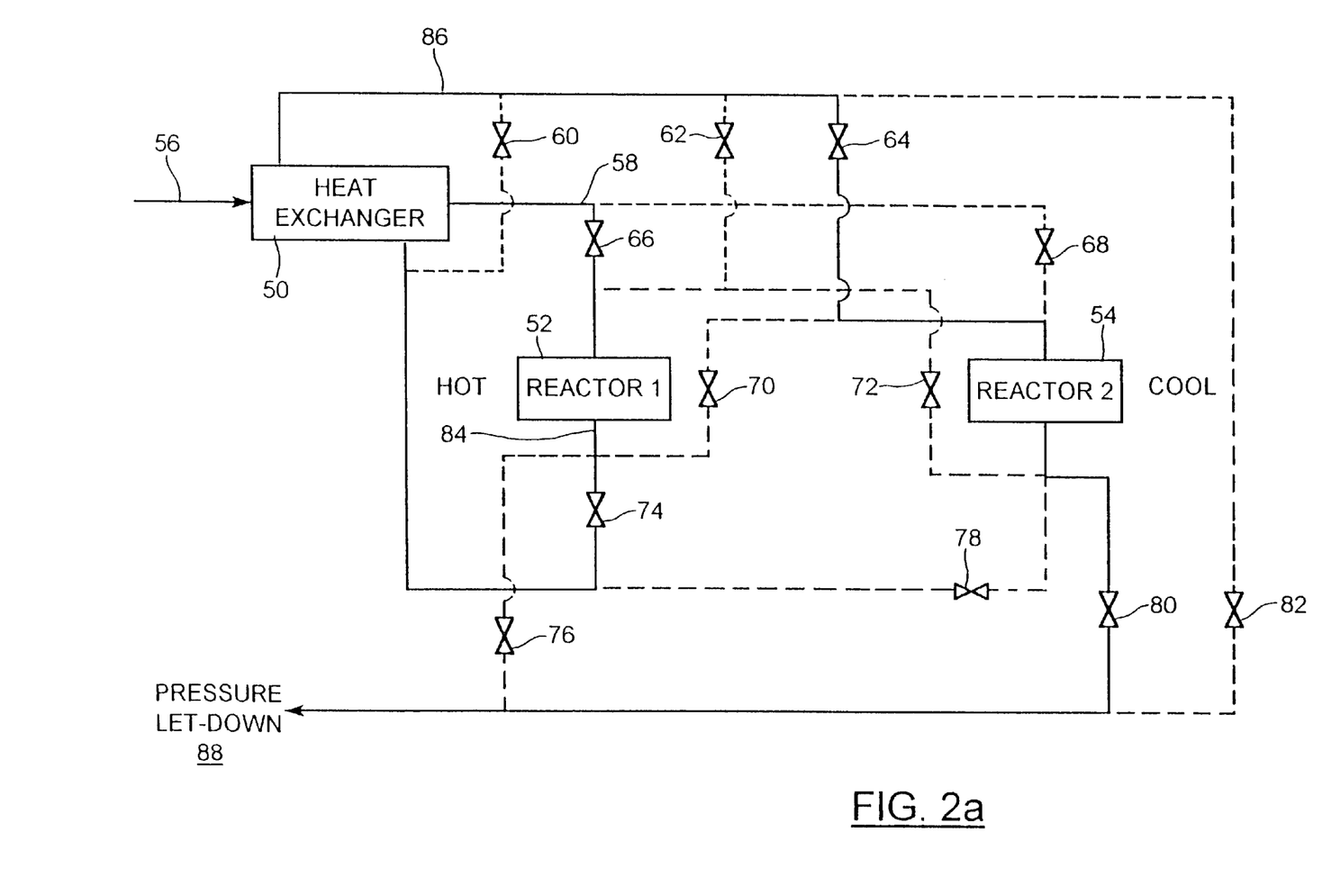
FIG. 2(a) is a schematic view of a first operating phase of a two reactor aspect of the present invention.

As shown in FIG. 2(a), the two reactor system comprises a heat exchanger 50, a first reactor 52 and a second reactor 54. In the first phase, which is shown in FIG. 2(a), valves 60, 62, 68, 70, 72, 76, 78 and 82 are closed while valves 64, 66, 74 and 80 are open. The feed/oxidant stream 56 enters the heat exchanger 50 and is heated therein to a temperature of about 300° C. The heated stream 58 exits the heat exchanger and is fed through a valve 66 into the first reactor 52. The hot reactor effluent 84, which comprises primarily carbon dioxide and water, passes through a valve 74 and into heat exchanger 50, wherein heat is extracted for use in heating the feed/oxidant stream 56. The cooled reactor effluent 86, now at a subcritical temperature and preferably at a temperature of about 300° C., exits the heat exchanger 50 and is fed through valve 64 into the second reactor 54. The cooled reactor effluent 86 dissolves and flushes any inorganic precipitates from the second reactor 54 and passes through valve 80 to any conventional pressure let down means 88 and subsequent disposal according to the nature of the dissolved inorganics.

As can be seen, in this first phase, the feed stream 56 is oxidized in reactor 52, and the hot effluent 84 of reactor 52 is used to heat the feed/oxidant stream 56 in the heat exchanger 50 and then, as cooled reactor effluent, to flush the second reactor 54 of any inorganic precipitates. Operation continues in this first operating phase until the level of scaling approaches an unacceptable level in reactor 52 when operation switches to the second operating phase shown in FIG. 2(b).

Figure 2B:
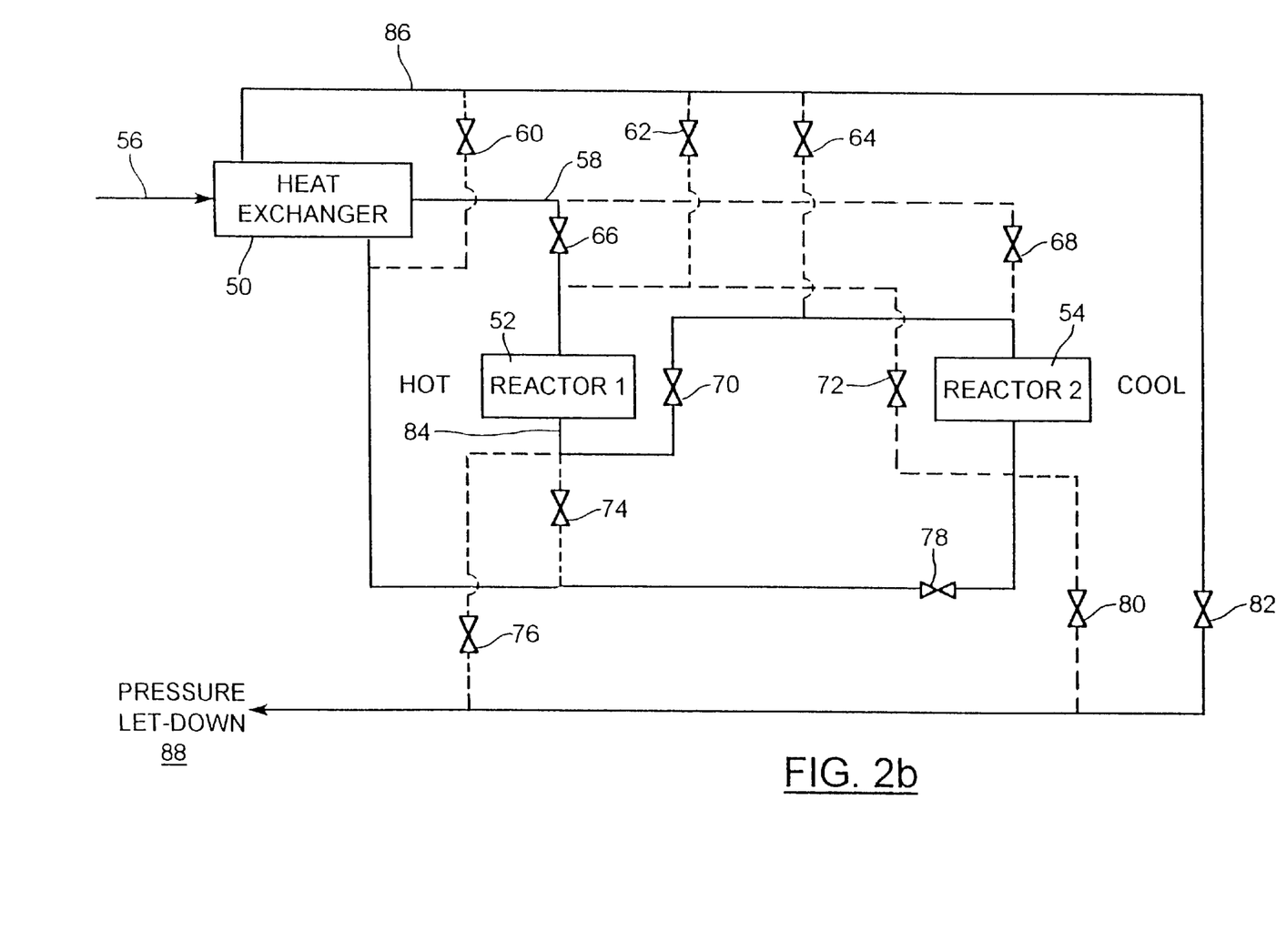
FIG. 2(b) is a schematic view of a second operating phase of the two reactor aspect of the present invention shown in FIG. 2(a).

In the second operating phase shown in FIG. 2(b), valves 66, 70, 78 and 82 are open while valves 60, 62, 64, 68, 72, 74, 76 and 80 are closed. The oxidation reaction in this second phase again occurs in the first reactor 52. However, in this case the second reactor 54 is flushed with hot reactor effluent 84 to pre-heat the second reactor 54 in preparation for carrying out oxidation in it. If such preheating is not done, there is a risk of incomplete oxidation when the heated feed/oxidant stream 58 is first introduced into the reactor. The heated feed/oxidant stream 58 spends a relatively short period of time in the reactor and if some of the heat of the oxidation reaction is used in raising the temperature of the relatively cold reactor, supercritical conditions may not be achieved for a sufficient period of time to ensure complete oxidation of the initial effluent flow. Operation in this second phase continues until the reactor has been preheated to a sufficient level to begin the oxidation reaction in it. Generally, this will take no more than a few minutes.

As with the first phase shown in FIG. 2(a), the feed/oxidant stream 56 enters heat exchanger 50 and is heated and exits as heated stream 58 which passes through valve 66 to the reactor 52. The hot reactor effluent 84 then passes through valve 70 and into the second reactor 54 where some of the heat of the hot reactor effluent 84 is absorbed by the reactor thereby preheating the second reactor 54. The hot reactor effluent then passes through valve 78 to heat exchanger 50 to pressure let down 88.

Figure 2C:
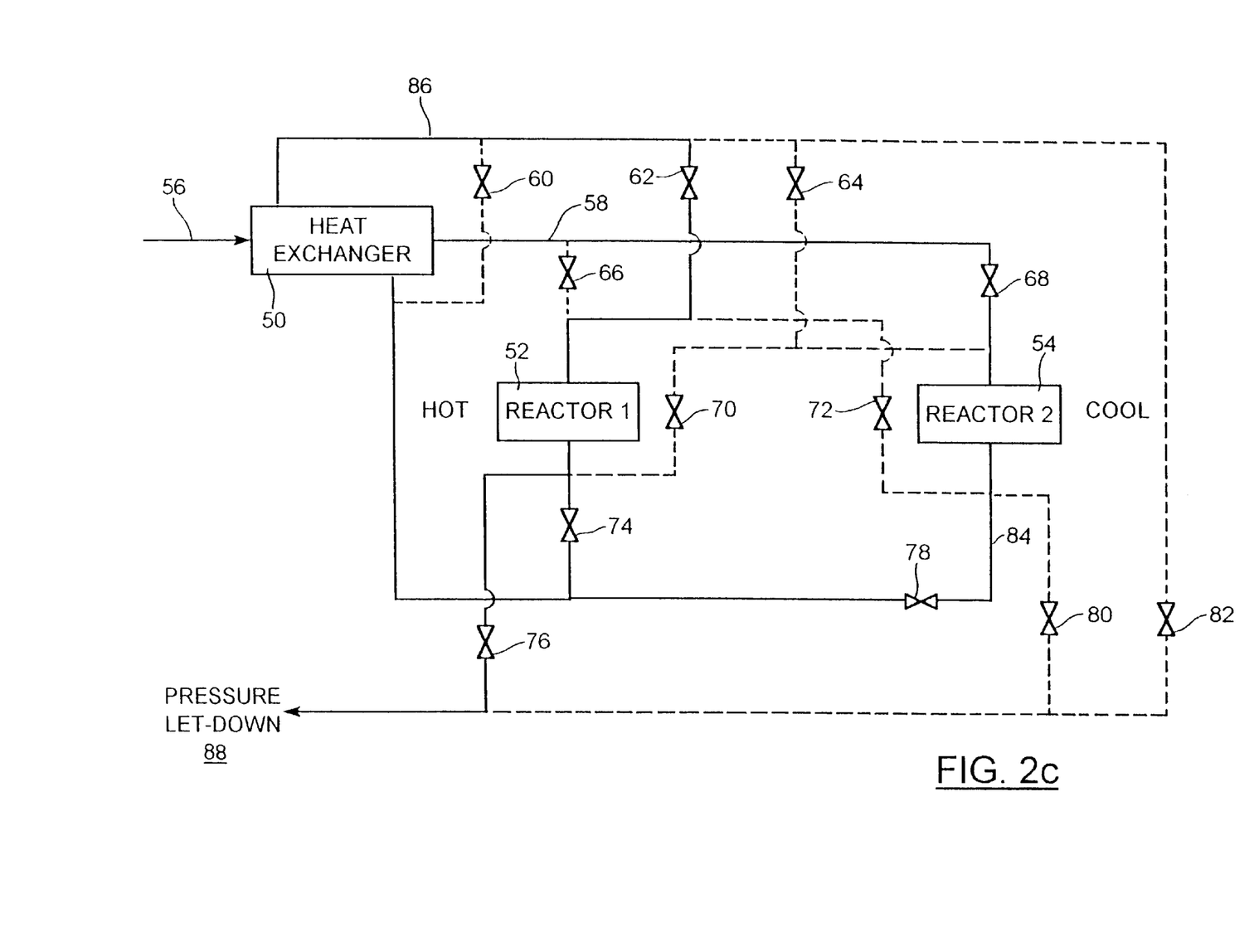
FIG. 2(c) is a schematic view of a third operating phase of the two reactor aspect of the present invention shown in FIG. 2(a).

In the third phase shown in FIG. 2(c), valves 60, 64, 66, 70, 72, 74, 80 and 82 are closed while valves 62, 68, 76 and 78 are open. The feed/oxidant stream 56 enters the heat exchanger 50 and is heated therein to a temperature of about 300° C. The heated stream 58 exits the heat exchanger and is fed through a valve 68 into the second reactor 54. The hot reactor effluent 84, which comprises primarily carbon dioxide and water, passes through a valve 78 and into heat exchanger 50, wherein heat is extracted for use in heating the feed/oxidant stream 56. The cooled reactor effluent 86, now at a subcritical temperature and preferably at a temperature of about 300° C., exits the heat exchanger 50 and is fed through valve 62 into the first reactor 52. The cooled reactor effluent 86 dissolves and flushes any inorganic precipitates from the first reactor 52 and passes through valve 76 to any conventional pressure let down means 88 and subsequent disposal according to the nature of the dissolved inorganics. Again, operation continues in this third phase until unacceptable levels of scaling are approached.

Figure 2D:
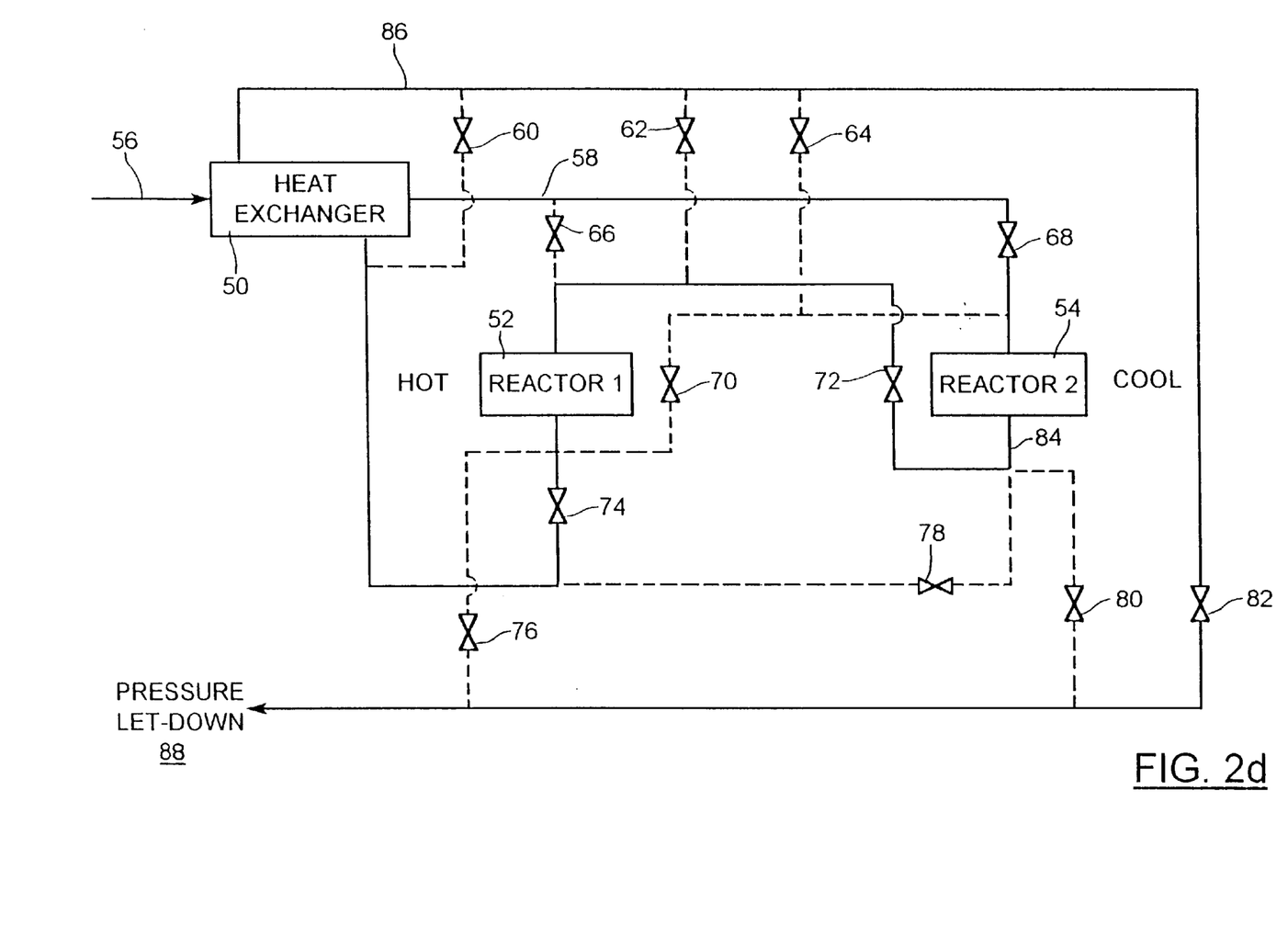
FIG. 2(d) is a schematic view of a fourth operating phase of the two reactor aspect of the present invention shown in FIG. 2(a).

In the fourth operating phase shown in FIG. 2(d), valves 60, 62, 64, 66, 70, 76, 78 and 80 are closed while valves 68, 72, 74 and 82 are open. The oxidation reaction in this fourth phase again occurs in the second reactor 54. However, in this case the first reactor 52 is flushed with hot reactor effluent 84 to pre-heat the first reactor 52 in preparation for carrying out oxidation in it. If such preheating is not done, there is, as previously discussed, a risk of incomplete oxidation when the heated feed/oxidant stream 58 is first introduced into the reactor.

As with the third phase shown in FIG. 2(c), the feed/oxidant stream 56 enters heat exchanger 50 and is heated and exits as heated stream 58 which passes through valve 68 to the reactor 54. The hot reactor effluent 84 then passes through valve 72 and into the first reactor 52 where some of the heat of the hot reactor effluent 84 is absorbed by the reactor thereby preheating the first reactor 52. The hot reactor effluent then passes through valve 74 to heat exchanger 50 to pressure let down 88.

These operating phases are then repeated.

The invention described here can be used not just for the oxidation of organics, but also, for example, to separate a waste steam containing dissolved inorganics into a smaller volume waste stream containing very high concentrations of inorganics and a waste stream that is essentially inorganic free. To effect such a separation, the waste stream containing inorganics can be raised to supercritical conditions by adding organic material to the waste stream, which is then oxidized as previously described, or by adding heat from an external source. In either case, the inorganics in the waste stream precipitate as scale under supercritical condition producing an essentially inorganic free effluent stream. Only a portion of this stream need be used to flush the reactor and remove the precipitated inorganics resulting in a lower volume of effluent with a more highly concentrated inorganic content.

It will be appreciated by those skilled in the art that many variations on the specific embodiments disclosed herein are possible without departing from the spirit or scope of the invention disclosed and claimed herein.

We claim:

1. In a continuous supercritical water oxidation process using first and second reactors, a method of removing inorganic scale material from a reactor surface at predetermined intervals of one reactor while the supercritical water oxidation process is taking place in the other reactor comprising the steps of:
    a) supplying a feed stream containing oxidizable material to said first and said second supercritical water oxidation reactors;
    b) oxidizing said feed stream under supercritical conditions at said first and said second reactors;
    c) terminating said supplying and said oxidizing of said feed stream at said second reactor after a predetermined time interval while maintaining said supplying and said oxidizing of said feed stream at said first reactor;
    d) selecting subcritical conditions for a flushing stream to solubilize said inorganic scale material;
    e) supplying said flushing stream into said second reactor through an inlet of said second reactor, said flushing stream being maintained at said subcritical conditions;
    f) solubilizing said inorganic scale material within said second reactor into said flushing stream; and
    g) repeating steps a) through f) to flush said first reactor while said supercritical water oxidation process takes place in said second reactor.

2. The method of claim 1 including the further step of preheating at least the one of said supercritical water oxidation reactors prior to step (a).

3. The method of claim 2 in which at least the one of said supercritical oxidation reactors is preheated by a hot aqueous stream substantially free of inorganic material.

4. The method of claim 3 in which an oxidant is added to said feed stream.

5. The method of claim 1 in which said flushing stream is cooled effluent from said first supercritical water oxidation reactor.

6. The method of claim 1 wherein the volume of the flushing stream is less than the volume of the feed stream.

7. The method of claim 6 in which said feed stream is comprised of oxidizable organic materials, inorganic materials and water.

8. The method of claim 6 in which said flushing stream is a subcritical aqueous stream.

9. The method of claim 1 wherein said step of selecting said subcritical conditions includes selecting a temperature of about 300° C.

10. A method of oxidizing a mixture of organic compounds, inorganic compounds and water in a supercritical water oxidation reactor comprising the steps of:
    (a) supplying a feed stream comprised of oxidizable organic materials, inorganic materials and water to a supercritical water oxidation reactor via a first inlet valve of said reactor;
    (b) supplying an oxidant to said reactor;
    (c) raising the temperature in said reactor to create supercritical conditions whereby said organic compounds are oxidized and at least some of said inorganic materials are precipitated;
    (d) selecting subcritical conditions for a flushing solution to solubilize said inorganic materials;
    (e) supplying said flushing solution at said subcritical conditions to said reactor via a second inlet valve of said reactor;
    (f) solubilizing and removing precipitated inorganic materials by flushing said reactor with said flushing solution in which said inorganic materials are soluble; said flushing being accomplished at intermittent intervals from a source in fluid communication with said second inlet valve, said first and said second inlet valves are operable for alternately supplying said feed steam and said flushing solution into said reactor, wherein the flushing solution is the effluent from a supercritical water oxidation reactor cooled to a temperature at which said inorganic materials are soluble in said flushing solution.

11. The method of claim 10 wherein, prior to step (a), said supercritical water oxidation reactor is preheated.

12. The method of claim 10 wherein said preheating of said reactor is done by supplying said supercritical oxidation reactor with effluent from a supercritical water oxidation reactor.

13. The method of claim 12 wherein the volume of the flushing solution is less than the volume of the feed stream from which said inorganic materials were precipitated.

14. The method of claim 10 wherein said flushing solution is a subcritical aqueous stream.

15. The method of claim 10 wherein the oxidant is hydrogen peroxide, sodium peroxide, air, oxygen or a mixture thereof.

16. The method of claim 10 wherein said step of selecting said subcritical conditions includes selecting a temperature of about 300° C.

* * * * *